Oct. 30, 1951     H. W. SUMNER     2,573,507

SUSPENSION BRIDGE

Filed Sept. 7, 1945

INVENTOR
Henry W. Sumner
BY Fred G. Matheny
ATTORNEY

Patented Oct. 30, 1951

2,573,507

UNITED STATES PATENT OFFICE 2,573,507

SUSPENSION BRIDGE

Henry W. Sumner, Seattle, Wash., assignor to
Walter E. Irving, Long Island City, N. Y.

Application September 7, 1945, Serial No. 614,854

3 Claims. (Cl. 14—18)

This invention relates to a suspension bridge and an object of this invention is to provide a suspension bridge wherein the possibility of developing undulations of dangerous magnitude is reduced to a minimum.

Another object is to provide a suspension bridge having means for absorbing or damping small vertical undulations or vibrations and dissipating their energy as heat so that these small vertical undulations or vibrations will not become cumulative and attain a great enough magnitude to seriously damage or destroy the bridge.

Another object is to provide a suspension bridge comprising a plurality of end to end, pivotally articulated, suspended bridge sections, each bridge section being substantially rigid and non-flexible vertically whereby vertical undulations in the bridge will be manifested by changes in relative alignment of the bridge sections rather than by vertical flexing of said bridge sections and said bridge sections having their adjoining articulated end portions interconnected by damping means that will yieldingly resist relative changes of alignment of said bridge sections in such a manner as to damp and suppress and dissipate the energy of forces tending to produce vertical undulations thereby preventing the building up in the bridge of harmonious motions of dangerous magnitude.

Another object is to provide a suspension bridge comprising a plurality of relatively rigid bridge sections suspended from overhead cables and articulated in end to end relation and interconnected by friction means so applied as to frictionally resist changes of alignment of said bridge sections produced by vertical undulations in the bridge.

Other objects of the invention will be apparent from the following description taken in connection with the accompanying drawings.

In the drawings.

Like reference numerals designate like parts throughout the several views.

Figure 1:
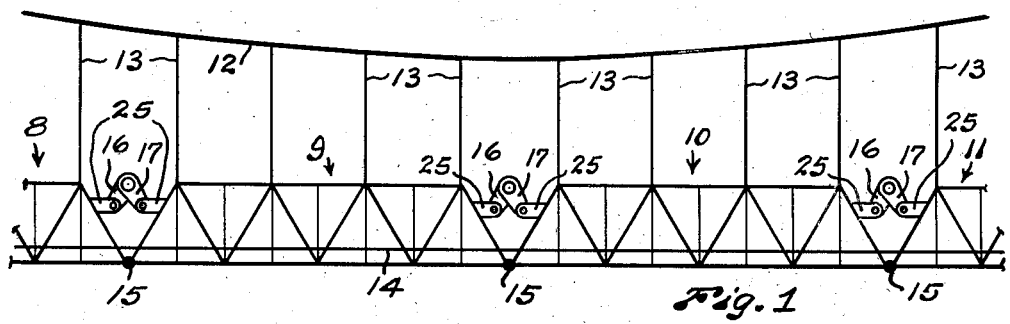
Figure 1 is a diagrammatic view showing a plurality of relatively rigid bridge sections suspended in end to end relation and interconnected by undulation damping means in accordance with this invention.

In Fig. 1 of the drawings the numerals 8, 9, 10 and 11 designate four sections of a suspension bridge, which it will be understood may be composed of any desired number of sections. The bridge sections 8, 9, 10 and 11 are all suspended from suspension cables 12, one of which is shown in Fig. 1, by tension members 13. Each bridge section 8, 9, 10 and 11 is of relatively rigid non-flexible construction so that, as a unit, it is not capable of vertical flexing movement. The bridge sections may be any suitable type of truss construction, as shown in the drawings, or they may be of other form. In constructing or repairing the bridge it is contemplated that these bridge sections can be handled as units and elevated into position and secured together after the cables 12 are properly installed. Obviously sections can be removed from and installed in such a bridge without disturbing other sections in the bridge.

The adjoining end portions of the several bridge sections are articulated by pivot means 15. A bridge, made up of any desired number of bridge sections will be provided with a continuous decking 14 to carry traffic. Preferably a portion of this decking or all of said decking will be of open mesh construction such as a steel grating that is capable of carrying the required loads. Such a grating construction will be less affected by suction lift and pressure resulting from generally horizontal winds passing thereover than a solid or imperforate decking would be. The use of this steel mesh type of decking is desirable but not essential in a suspension bridge constructed in accordance with this invention, as the damping means herein provided will suppress undulations of dangerous magnitude irrespective of the type of decking used in the bridge.

The decking 14 has sufficient flexibility at the locations of the pivotal connections 15 between the bridge sections so as to allow some movement in these pivotal connections 15. Hence vertical undulations in the bridge will be manifested chiefly by angular movement in these pivotal connections 15.

In accordance with my invention I provide damping means for resisting relative angular movement in the pivotal connections 15 and relative change of alignment between the adjacent bridge sections and for dissipating the energy which tends to produce cumulative vertical undulations in the bridge.

Figure 3:
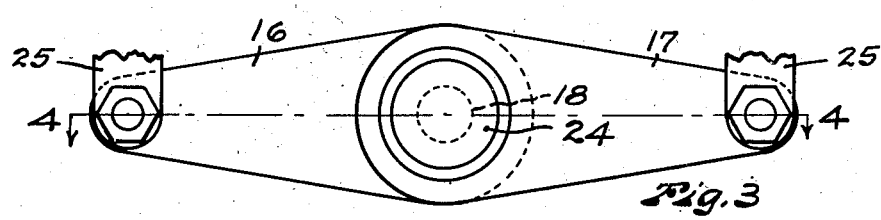
Fig. 3 is a side view of one type of damping means that may be used in the manner illustrated in Figs. 1 and 2.
Figure 4:
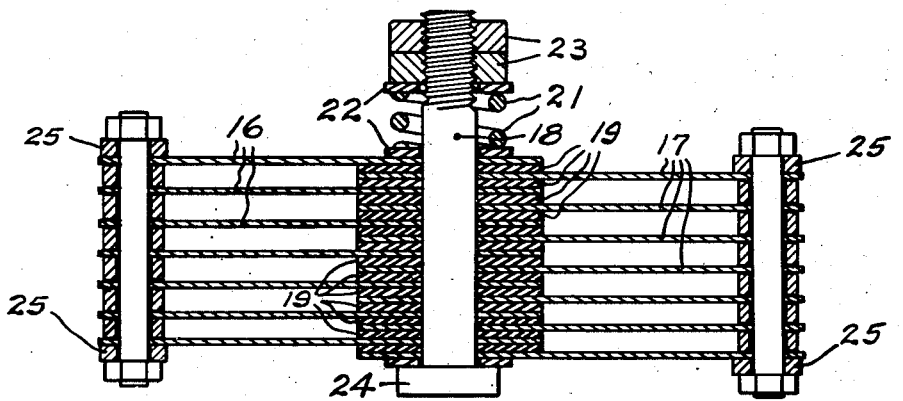
Fig. 4 is a sectional view of said damping means taken substantially on broken line 4—4 of Fig. 3.

One energy dissipating device that can be used for this purpose is a friction device more clearly shown in Figs. 3 and 4. This device comprises two sets of friction plates 16 and 17 mounted for pivotal movement on a hub member 18 and having friction discs or washers 19 interposed between them.

The plates 16 and 17 with the friction washers 19 interposed between them are held in frictional engagement with each other by a spring 21. The spring 21 is disposed between washers 22 on the hub member 18 and is adjustably supported by nut means 23. A head 24 is provided on the end of the hub member 18 opposite the nut means 23.

Adjustment of the pressure of the spring 21 by nut means 23 will adjust the load on all of the friction washers 19 and plates 16 and 17 in the friction unit thereby varying the resistance to movement offered by said unit. Obviously the number of plates and friction washers in one of these friction units may be varied as desired.

The plates 16 and 17 extend outwardly from the hub member 18 to form lever arms and said plates may taper, as shown. These plates form adequate heat radiating means to radiate to the atmosphere any heat generated by the friction devices. These plates 16 and 17 may be positioned at any desired angle relative to each other when in use.

The plates 16 and 17 are connected with the end portions of two adjacent bridge sections in such a manner that relative angular movement of the two adjacent bridge sections will tend to angularly move the plates 16 and 17 against the frictional resistance offered by the washers 19 in contact with said plates 16 and 17.

One way of applying this damping device to bridge sections is shown in Fig. 1 in which the outer end portions of the two sets of plates 16 and 17 of a friction unit are connected by suitable shackle or bracket means 25 with the end portions of the adjacent bridge sections.

Figure 2:
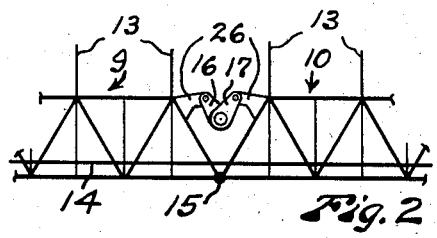
Fig. 2 is a view similar to Fig. 1 showing adjacent end portions of two of the bridge sections with the damping means applied thereto in a different manner.

Another way of applying said friction device to the bridge sections is to invert the friction or damping device as respects the showing in Fig. 1 and connect the same with the end portions of the bridge spans by brackets 26 as shown in Fig. 2.

Both Fig. 1 and Fig. 2 show an arrangement in which leverage is provided so that a slight angular movement of the bridge spans relative to each other will produce a greater relative angular movement of the friction plates 16 and 17.

Figure 5:
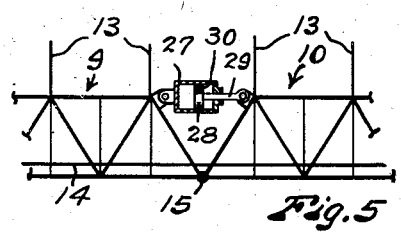
Fig. 5 is a diagrammatic view similar to Figs. 1 and 2 but showing a different type of damping means interposed between adjacent end portions of two articulated bridge sections.

Fig. 5 diagrammatically illustrates hydraulic means of dash pot type interconnected between the adjacent ends of two bridge sections in such a manner as to resist relative angular movement of said two bridge sections. Such hydraulic means may comprise a liquid tight hydraulic cylinder 27 connected with one bridge section 9 and filled with liquid, as oil, and having a closely fitting piston 28 that is connected by a piston rod 29 with an adjacent bridge section 10. The piston 28 may have a passageway 30 of very small cross sectional area extending therethrough to provide for a slow passage of liquid from one side to the other of the piston 28. Relative angular movement between the two bridge sections 10 and 11 will tend to relatively move the piston 28 and cylinder 27 longitudinally and the liquid in the cylinder 27 will tend to retard and slow this movement thus tending to suppress vertical undulations.

Obviously damping devices of other types may be used to secure the same damping effect as those herein described.

The foregoing description and accompanying drawings disclose preferred embodiments of my invention but it will be understood that this disclosure is merely illustrative and that changes may be made within the scope and spirit of the following claims.

I claim:

1. In a suspension bridge, suspension cable means, a plurality of bridge sections suspended from said suspension cable means in end to end relation, each bridge section being rigid vertically; horizontal transverse pivot means pivotally connecting adjoining end portions of said bridge sections together; energy dissipating damping means spaced from said pivot means interconnecting adjacent end portions of said bridge sections adapted to yieldingly resist all relative vertical pivotal movement of the bridge sections with which said damping means is connected; and a continuous bridge deck carried by said bridge sections, said bridge deck being capable of vertical flexing at the location of the adjoining pivotally connected ends of said bridge sections.

2. In a suspension bridge, suspension cable means; a plurality of bridge sections suspended from said suspension cable means and disposed in end to end relation, each bridge section being substantially rigid in vertical directions; continuous bridge deck means carried by said bridge sections; horizontal pivot means positioned adjacent the plane of said bridge deck means and extending crosswise of said bridge sections and pivotally interconnecting adjacent end portions of said bridge sections; and friction means spaced from said pivot means and interconnected between adjacent end portions of said bridge sections operable to yieldingly resist relative vertical pivotal movement of the bridge sections with which it is connected and suppress vertical undulations of the bridge.

3. In a suspension bridge, suspension cable means; a plurality of bridge sections suspended from said suspension cable means in end to end relation, each of said bridge sections being rigid vertically; transverse horizontal pivot means directly connecting adjoining end portions of said bridge sections together for relative vertical movement; and energy dissipating damping means interposed between adjacent end portions of said bridge sections and spaced from said transverse pivot means and connected with said bridge sections and providing resistance to all relative angular movement of said bridge sections about said pivot means, whereby cumulative vertical undulating movement of said bridge sections is suppressed.

HENRY W. SUMNER.

REFERENCES CITED

The following references are of record in the file of this patent:

UNITED STATES PATENTS

| Number | Name | Date |
| --- | --- | --- |
| 110,546 | Campbell | Dec. 27, 1870 |
| 279,927 | Emery | Apr. 29, 1879 |
| 1,146,283 | Rush | July 13, 1915 |
| 1,842,136 | Wichert | Nov. 29, 1929 |
| 1,895,734 | Rush | Jan. 31, 1933 |
| 2,152,896 | Maddock | Sept. 4, 1936 |
| 2,330,981 | Maddock | Oct. 5, 1943 |
| 2,358,672 | Vaitia | Sept. 19, 1944 |
| 2,368,907 | Whitnall | Feb. 6, 1945 |

OTHER REFERENCES

Civil Engineering, page 325, July 1943.